United States Patent [19]

Aizikowitz et al.

[11] Patent Number: 5,890,000
[45] Date of Patent: Mar. 30, 1999

[54] COOPERATION OF GLOBAL AND LOCAL REGISTER ALLOCATORS FOR BETTER HANDLING OF PROCEDURES

[75] Inventors: Nava E. Aizikowitz, Haifa; Roy N. Bar-Haim, Neve-Monoson; Orit Edelstein, Haifa, all of Israel; Edward Curtis Prosser; Robert Ralph Roediger, both of Rochester, Minn.

[73] Assignee: International Business Machines Corporation, Armonk, N.Y.

[21] Appl. No.: 760,176

[22] Filed: Dec. 4, 1996

[51] Int. Cl.⁶ .................................................. G06F 9/44
[52] U.S. Cl. ..................... 395/709; 395/707; 395/708; 711/109; 711/202; 711/209
[58] Field of Search ........................... 711/202–203, 209, 711/109; 395/708, 707, 709, 651, 705, 393–394, 591, 674

[56] References Cited

U.S. PATENT DOCUMENTS

| | | | |
|---|---|---|---|
| 4,435,753 | 3/1984 | Rizzi ....................................... | 364/200 |
| 4,571,678 | 2/1986 | Chaitin .................................... | 395/707 |
| 4,656,582 | 4/1987 | Chaitin et al. .......................... | 364/300 |
| 4,782,444 | 11/1988 | Munshi et al. .......................... | 395/709 |
| 4,961,141 | 10/1990 | Hopkins et al. ........................ | 364/200 |
| 5,249,295 | 9/1993 | Briggs et al. ........................... | 395/709 |
| 5,339,428 | 8/1994 | Burmeister et al. .................... | 395/707 |
| 5,367,651 | 11/1994 | Smith et al. ............................. | 395/709 |
| 5,367,684 | 11/1994 | Smith ...................................... | 395/709 |
| 5,418,958 | 5/1995 | Goebel .................................... | 395/709 |
| 5,481,708 | 1/1996 | Kukol ...................................... | 395/709 |
| 5,530,866 | 6/1996 | Koblenz et al. ......................... | 395/708 |
| 5,535,391 | 7/1996 | Hejlsbert et al. ........................ | 395/709 |
| 5,555,417 | 9/1996 | Odnert et al. ........................... | 395/797 |
| 5,564,031 | 10/1996 | Amerson et al. ........................ | 711/209 |

OTHER PUBLICATIONS

A. Eichenberger et al, "Register Allocation for Predicated Code", IEEE Comput. Soc. Press. Proceedings of the 28th Annual International Symposium om Microarchitecture, Nov. 1995, pp. 180–191.

C. Foster III et al, "An Empirical Investigation of the Haifa Register Alloation Technique in the GNU C Compiler", IEEE Southeastcon Apr. 1992, vol. 2, pp. 776–779.

L. Lozano et al, "Exploiting Short–lived Variables in Superscalar Processors", IEEE Comp. Soc. Press. Proceedings of the 28th Annual International Symposium on Microarchitecture, Nov. 1995, pp. 292–302.

C. Norris et al, "An Experimental Study of Serval Cooperative Register Allocation and Instruction Scheduling Strategies", IEEE Comput. Soc. Press. Proceedings of the 28th Annual International Symposium on Microarchitecture, Nov. 1995, pp. 169–179.

"Register Allocation by Priority–based Coloring," F. Chow and J. Hennessy, (Proceedings of the ACM SIGPLAN '84 Symposium on Compiler Construction).

"Register Allocation Via Hierarchical Graph Coloring," D. Callahan and B. Koblenz, (Proceedings of the ACM SIGPLAN '91 Conference on Programming Language Design and Implementation, Jun. 26–28, 1991).

Primary Examiner—James P. Trammell
Assistant Examiner—Cuong H. Nguyen
Attorney, Agent, or Firm—Jack V. Musgrove; Owen J. Gamon

[57] ABSTRACT

A method and device for optimizing a compiler involves cooperation between the global and local register allocators in assigning symbolic registers to hardware registers. A large procedure may have many associated symbolic registers; the invention involves partitioning the symbolic registers into at least two portions, and allowing the global register allocator to assign one portion and the local register allocator to assign another portion. The registers may be partitioned based on different criteria, such as local vs. global registers, or spill costs, or shallow vs. nested regions.

13 Claims, 3 Drawing Sheets

COOPERATION OF GLOBAL AND LOCAL REGISTER ALLOCATORS FOR BETTER HANDLING OF PROCEDURES

BACKGROUND OF THE INVENTION

1. Field of the Invention

The present invention generally relates to computer programming and, more particularly, to a method and device for optimizing a compiler to more efficiently handle big procedures, by providing cooperation between global and local register allocators.

2. Description of the Prior Art

Computer processors, whether designed for small personal computers or large mainframes, have various hardware locations referred to as registers, for storing data and computer code while a computer program is running. After a computer program is written, it must be converted from human-readable source code into machine code which can be executed by the processor. The manner in which the machine code is created, or compiled, depends among other things upon the number and types of hardware registers used in the particular processor.

"Register allocation" refers to the process within an optimizing compiler of deciding how given data items are assigned to machine registers at various times during the compiled program's execution. In the type of register allocator described herein, all eligible data items are labeled as "symbolic" registers; the compiler assumes an infinite supply of these is available. The register allocator's job is to map these symbolic registers to the finite number of registers actually available on the physical hardware. Strong register allocators that generate fast code are important for machines with expensive memory references and for code with many redundant register copy instructions.

Registers can be assigned for use both locally and globally. A basic block is a sequence of instructions which is guaranteed to execute consecutively—in other words, a sequence of instructions where the first instruction is at the start of the block and the last instruction is at the end of the block. By this definition, a program can be broken down into its constituent basic blocks. A symbolic register is considered to be local if the register is first defined and then used within only a single basic block. A symbolic register is considered global if a use of the register in one basic block is reached by a definition in another basic block (there is a flow of execution from the definition to the use along which the register is not redefined).

A local register allocator is one that assigns hardware registers to symbolic registers without analyzing the possible execution flows between basic blocks. For registers which have global lifetimes, a local allocator must store and load the register to/from memory at points where the lifetime overlaps more than one block—storing after definitions of the register, and loading the register prior to uses in blocks that are reached by definitions outside the block, even though these stores and loads may be unnecessary.

A global register allocator performs some form of liveliness analysis to determine the exact extent of each register's lifetime—finding which portions of the program a symbolic register must be assigned to a hardware register. Armed with this information, a global allocator can avoid some or all of the loads and stores that local allocators have to conservatively insert. Global register allocators typically require more computation time and space to complete register allocation than do local register allocators, due primarily to the added complexity of computing liveliness analysis.

There are various methods of optimizing register allocators. One problem with optimizing compilers is that it is sometimes not practical for the global allocator to handle procedures with arbitrarily large numbers of symbolic registers. It may be desirable to limit the number of symbolic registers that can be handled by the global allocator either because of restrictions on the size of the data structures used by the allocator in its operation, where the size of the data structures is a function of the number of symbolic registers, or because of compile time considerations. For routines that require a number of symbolic registers which is beyond a predetermined limit, a simpler and faster local allocator may be used, but this may generate slower code. Alternatively, it may be that the routine must be compiled without optimization.

A live range, as used herein, refers to a span of a program during which a particular data item is needed. The data item is defined whenever it is loaded or computed into a register, and used when the value in the register is used to compute another value or when the value in the register is stored to memory. A live range contains one or more definitions of the data item and all the intervening code between those definitions and the uses of the data items that are reached by them. For example, consider "c" in the following code segment:

$$\text{if}(a == b) \quad \text{then } c = 1;$$
$$\text{else } c = 2;$$
$$\text{print } (c);$$

The variable "c" is defined along both legs of the condition statement, and then printed. Both definitions reach the use, so all three mentions of "c" are in the same lifetime. Lifetime analysis is a global dataflow technique for finding the live ranges in a program.

Two live ranges are said to interfere if it would be illegal to assign both of the respective data items to the same register (because the live ranges overlap). Two live ranges that overlap only at a register copy instruction do not interfere and can possibly be combined into a single live range. The number of live ranges that overlap at any given program point is called the register pressure at that point. The standard register allocation technique (due to Chaitin) is to build a so-called interference graph, in which each node represents a live range and there is an edge between two nodes if and only if the corresponding live ranges interfere. The process of assigning live ranges to registers in a machine with K registers is then equivalent to coloring the nodes of the interference graph using at most K colors and in a manner where no two adjacent nodes have the same color. Various heuristic techniques are used to accomplish this. See, e.g., "Register Allocation by Priority-Based Coloring" (ACM SIGPLAN 1984 Symposium proceedings, pp. 222–232), which uses priority assignments for node-coloring in global register allocation.

If the register pressure at a given program point exceeds the number of physical registers in the machine, not all live ranges can be assigned to physical registers. Therefore, one or more live ranges must be "spilled," ie., stored in a memory location instead of a register. Spilling one live range results in two or more smaller live ranges composed of subsets of the definitions and uses of the original live range. Because of this, if any spilling occurs, the live ranges must be recomputed and the interference graph rebuilt and recolored. This entire process can greatly increase compile time.

One alternative solution to this problem is to design a register allocator that minimizes the number of dynamic memory references, as discussed in the article, "Register Allocation Via Hierarchical Graph Coloring" (ACM SIGPLAN 1991 Conference proceedings, pp. 192–203). This technique results in an allocation that is sensitive to local usage patterns while retaining a global perspective. It is not clear how well this technique scales to large procedures.

It would, therefore, be desirable and advantageous to devise an optimizing compiler which can handle large procedures which have very large numbers of symbolic registers, while still generating good code with quick compile time.

SUMMARY OF THE INVENTION

It is therefore one object of the present invention to provide a method of optimizing a compiler to improve handling of big procedures.

It is another object of the present invention to provide such a method for procedures which have a large number of symbolic registers, without generating slower code.

It is yet another object of the present invention to provide such a method which is not significantly affected by the size of the compiler's data structures and which does not require excessive compile time.

The foregoing objects are achieved in a method of compiler optimization generally comprising cooperation between first and second register allocators, by partitioning the symbolic register set into portions, assigning one portion to the hardware registers using the first register allocator, and assigning another portion to the hardware registers using the second register allocator. In the embodiment wherein the first register allocator is a local allocator and the second register allocator is a global allocator, the local register allocator preferably assigns its portion first and the global register allocator assigns the remaining portions. The global allocator could alternatively run first, followed by the local allocator. The local register allocator may assign all the registers which have local live ranges, and the global register allocator may assign all the registers which have global live ranges. Alternatively, if one of the portions has higher spill costs, then the portion having small spill costs is preferably assigned by the local register allocator, and the portion having high spill costs is assigned by the global register allocator. In a further alternate embodiment, the local register allocator assigns registers whose live ranges do not overlap deeply nested regions of the intermediate representation, and lets the global register allocator assign registers whose live ranges overlap or are contained within deeply nested regions. The resulting code is more efficient than that generated by the local allocator, but with a shorter compile time than that needed by the global allocator.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE PREFERRED EMBODIMENT

Computer programs are written in various human-readable languages, or source code, which must be converted into object code in order to run on a computer. A computer programmer uses a "compiler" (a special utility program) to create the machine-readable object code. Compilers generally translate each statement in the source code into one or more intermediate language instructions, which are then further converted into corresponding object code instructions. Special compilers, called optimizing compilers, typically operate on the intermediate language instructions to increase program efficiency, e.g., by eliminating unneeded or redundant instructions.

The present invention addresses possible data structure space limitations and compile time considerations when handling big procedures, by providing cooperation between different register allocators and, particularly, between the slower and more complex global register allocator that generates more efficient code and the faster and simpler local register allocator that may generate less efficient code. The result is the generation of better code than that generated by the local allocator in a shorter compile time than that needed by the global allocator.

Figure 1:
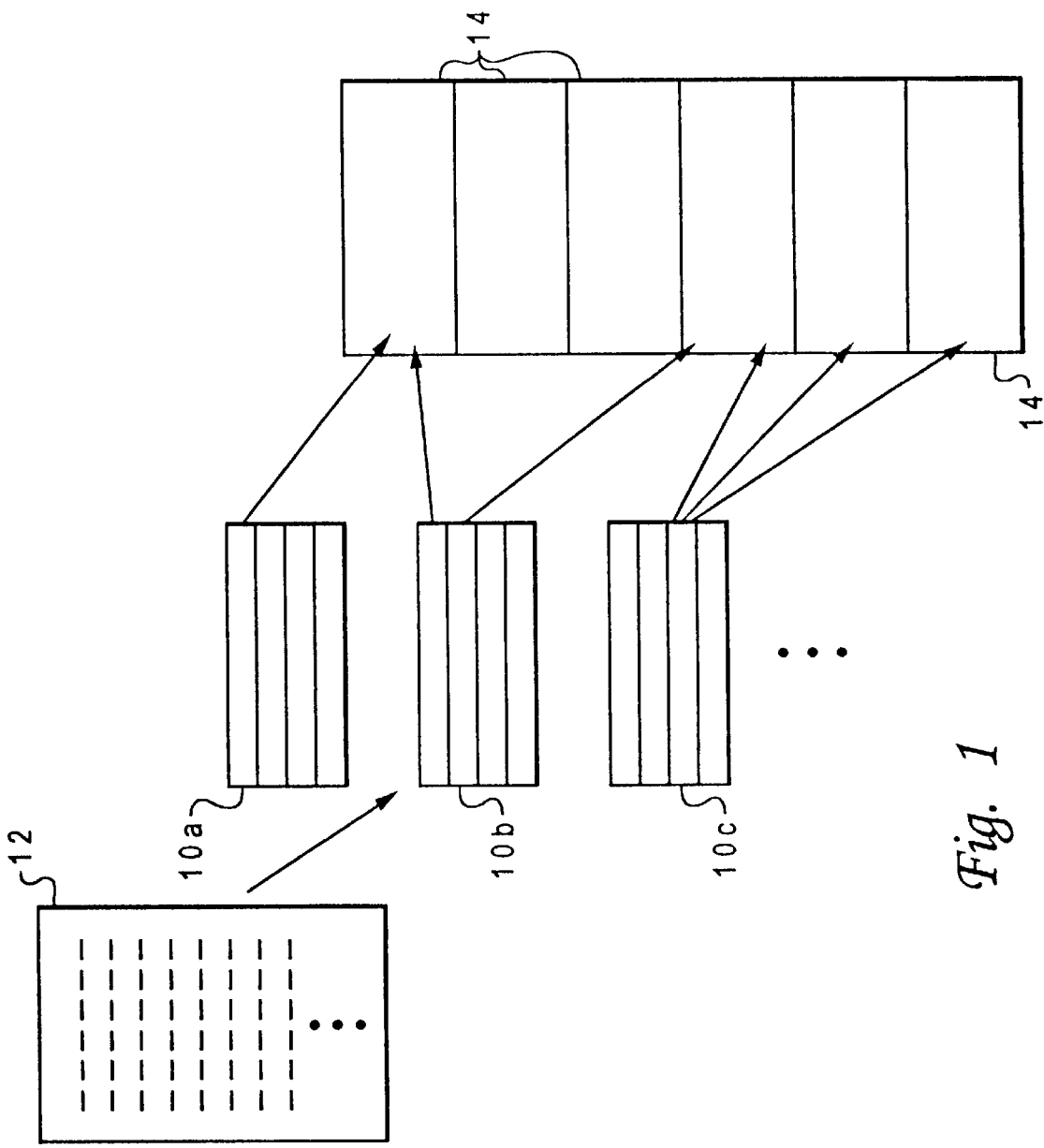
FIG. 1 is a representation of source code having a large procedure which is converted into a plurality of symbolic register sets having portions which are individually assigned to various hardware registers.

As shown in FIG. 1, the method involves mapping an arbitrary number of symbolic register sets, such as a set of symbolic registers for a basic block, onto a finite set of hardware registers 14 in a computational device (ie., a computer processor). The symbolic register sets correspond to an intermediate representation 12 of source code. The method requires partitioning at least one of the symbolic register sets into a plurality of portions (one or more symbolic registers) as indicated at 10a, 10b, 10c, 10d, assigning one of the hardware registers to at least one portion using a first register allocator, such as the local register allocator, and assigning the same or a different hardware register to at least one other portion using a second register allocator, such as the global register allocator. In this manner, any particularly large procedure in the object code is optimized with respect to compile time and efficiency of the object code. A global register allocator generally produces more efficient code, particularly for symbolic registers having global live ranges, but it is more complex and requires greater compile time. A local register allocator saves on compile time but generates less efficient code.

There are many different kinds of register allocators used in different optimizing compilers, so the present invention should not be construed as being specifically limited to cooperation between the local and global register allocators. For example, a compiler might also have an intermediate or medium-range register allocator (using a hybrid approach in order to be more compile-time efficient, but generate slightly less efficient code), and the present invention could be carried out by using any combination of these three register allocators to allocate the partitioned portions of the symbolic register set (i.e., using only the local and global allocators, or only the local and intermediate allocators, or only the intermediate and global allocators, or using all three). For those systems having local and global allocators, the local register allocator can assign the first portion of the symbolic register, and the global allocator assigns the rest. This ordering of the execution of the allocators should not be considered limiting to the scope of the invention. The allocators could execute in any order, both with respect to each other and with respect to other optimization phases of the compiler.

Figure 2:
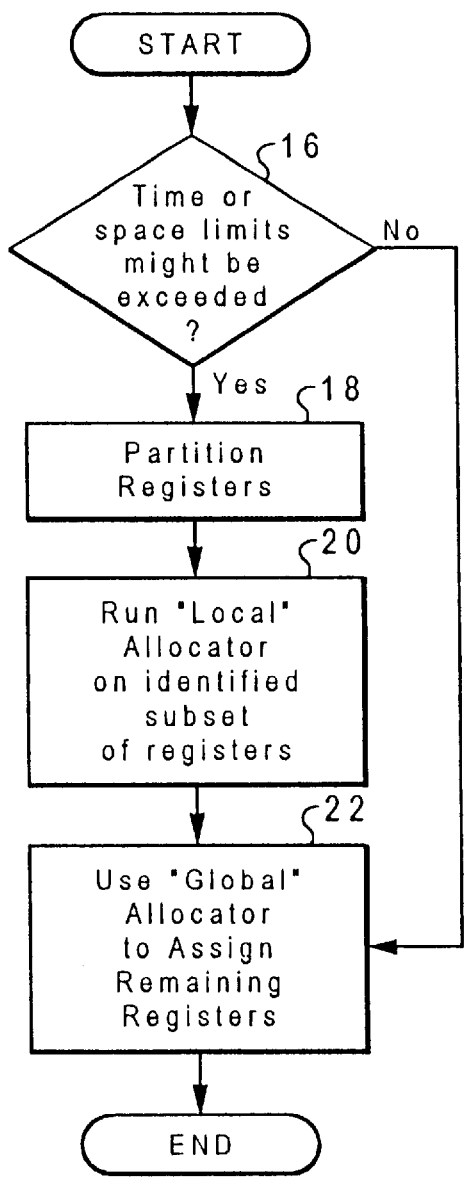
FIG. 2 is a flowchart depicting the basic compiling technique of the present invention.

FIG. 2 depicts the general compiling technique of the present invention. If time or space limits might be exceeded (16), then the symbolic registers are partitioned (18), as is discussed further in conjunction with FIG. 3. As part of this partitioning process, one or more portions of the symbolic registers are marked for allocation by the first register allocator (e.g., the local register allocator). Thereafter, this first register allocator is applied to the identified subset of symbolic registers (20). After the first register allocator has assigned those identified portions, the remaining portions are assigned by other register allocators, e.g., the global register allocator (22).

Figure 3:
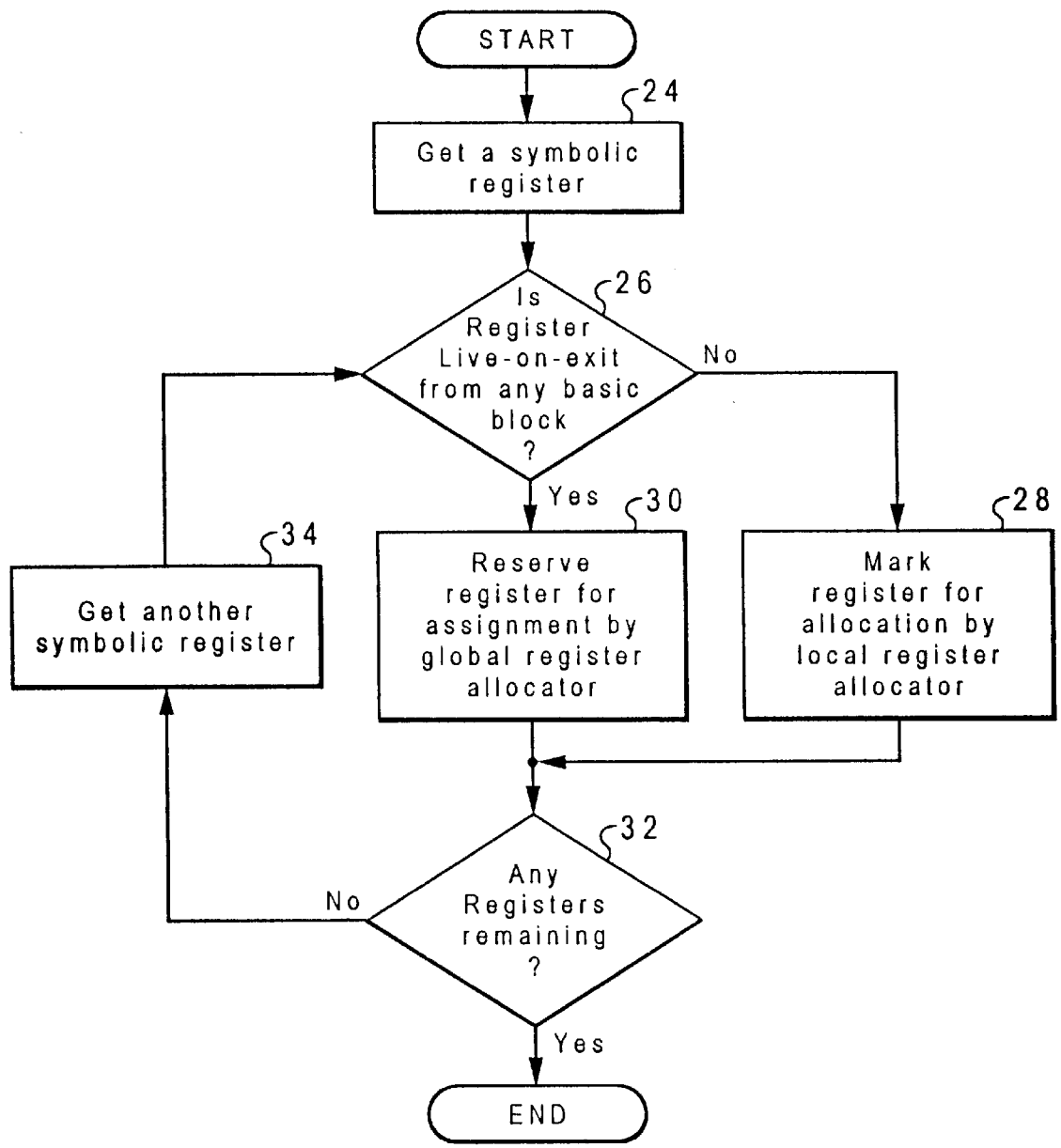
FIG. 3 is a flowchart depicting one method of partitioning a symbolic register for allocation according to the present invention.

For the local and global allocator cooperation, the registers may be partitioned in many different ways. One method is shown in FIG. 3. A symbolic register in the set is examined (24,26) according to a selected criterion. Depending on what order the register assignment is to be done, the global register allocator may mark a symbolic register for subsequent assignment by the local register allocator (as illustrated by steps 28 and 30 in FIG. 3), or the local register allocator may mark a symbolic register for subsequent assignment by the global register allocator (not shown). This process is repeated for each symbolic register in the set (32,34).

In many cases, approximately 10% of the symbolic registers have global lifetimes, which means that this embodiment will allow the compiler to handle procedures that are ten times bigger than ones handled without this improvement. As an alternative to this selection criterion, the local register allocator may assign portions with small spill costs, and the global register allocator may assign portions of the symbolic registers with high spill costs. In this context, a register might be deemed too expensive to spill if its spill cost is above a predetermined threshold. As a further alternative, the local register allocator may be used to assign symbolic registers in shallow regions and the global allocator used to assign the registers contained in more deeply nested regions. In this context, a symbolic register having a "shallow" region is one whose live ranges never overlap a deeply nested region. Nesting may be considered "deep" based on various parameters; for the present invention, it is useful to consider a region as being deeply nested if its nesting level is above a predetermined threshold. Standard register allocation techniques (such as the use of interference graphs) may be used to implement the foregoing alternatives. See, e.g., U.S. patent application Ser. No. 08/562,139 (Docket RO9-95-052), which is hereby incorporated.

The invention may be practiced by any computational device adapted for compiling computer code, to create object code which is to be loaded into a computer having a plurality of hardware registers. The computational device performing the compilation does not necessarily have the same processor architecture (e.g., number and types of registers) as the computer on which the object code is to run, although this certainly can be the case. The computational device requires memory, such as random access memory (RAM), for storing the computer code to be compiled, additional memory (possibly also RAM) for storing the compiler program instructions, and a processor to carry out the program instructions in compiling the code.

Estimates indicate that this optimization technique improves performance of generated code, particularly of procedures that are too big to be handled by a global register allocator, by up to 17% or more over that generated by the local register allocator.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A computer-implemented method of mapping an arbitrary number of symbolic registers onto a finite set of hardware registers in a computational device, comprising the steps of:

partitioning said symbolic registers into first and second portions;

assigning said first portion of said symbolic registers to said hardware registers using a first register allocator, wherein said first register allocator is a local register allocator having a first allocation operation; and assigning said second portion of said symbolic registers to said hardware registers using a second register allocator, wherein said second register allocator is a global register allocator having a second allocation operation, and wherein said first allocation operation is faster than said second allocation operation.

2. The method of claim 1 wherein:

said partitioning step additionally partitions said symbolic registers into a third portion; and said third portion of said symbolic registers is assigned to said hardware registers using either said first register allocator or said second register allocator or a third register allocator, after said first and second portions have been assigned.

3. The method of claim 1 wherein:

said partitioning step further partitions said symbolic registers into a third portion; and said third portion is assigned to said hardware registers using a third register allocator.

4. The method of claim 1 wherein said local register allocator assigns said first portion of said symbolic registers before said global register allocator assigns said second portion of said symbolic registers.

5. The method of claim 1 wherein:

said symbolic registers include at least one portion having local live ranges and at least one portion having global live ranges;

said portion of said symbolic registers having local live ranges is assigned by said local register allocators; and said portion of said symbolic registers having global live ranges is assigned by said global register allocator.

6. The method of claim 1 wherein:

said symbolic registers include at least one portion having first spill costs and at least one portion having second spill costs, wherein said first spill costs are smaller than said second spill costs;

said portion of said symbolic registers having first spill costs is assigned by said local register allocator; and said portion of said symbolic registers having second spill costs is assigned by said global register allocator.

7. The method of claim 1 wherein:

said symbolic registers include at least one portion having a shallow region and at least one portion having a nested region;

said portion of said symbolic registers having said shallow region is assigned by said local register allocator; and said portion of said symbolic registers having said nested region is assigned by said global register allocator.

8. A computer-implemented method of compiling computer code containing at least one procedure, to create object code which is to be loaded into a computer having a plurality of hardware registers, by optimizing compile time and efficiency of the object code, comprising the steps of:

creating a plurality of symbolic registers based on said procedure;

partitioning said symbolic registers into first and second portions;

assigning said first portion of said symbolic registers to said plurality of hardware registers using a local register allocator having a first allocation operation with a first efficiency level of code creation; and assigning said second portion of said symbolic registers to said plurality of hardware registers using a global register allocator having a second allocation operation with a second efficiency level of code creation, wherein the first allocation operation is faster than the second allocation operation and the first efficiency level of code creation is less efficient than the second efficiency level of code creation.

9. The method of claim 8 wherein:

said partitioning step additionally partitions said symbolic registers into a third portion; and said third portion of said symbolic registers is assigned to said hardware registers using said global register allocator, said local register allocator assigning said first portion before said global register allocator assigns said second and third portions.

10. The method of claim 8 wherein said local register allocator assigns said first portion of said symbolic registers before said global register allocator assigns said second portion of said symbolic registers.

11. The method of claim 8 wherein:

said symbolic registers include at least one portion having local live ranges and at least one portion having global live ranges;

said portion of said symbolic registers having local live ranges is said first portion assigned by said local register allocator; and said portion of said symbolic registers having global live ranges is said second portion assigned by said global register allocator.

12. The method of claim 8 wherein:

said symbolic registers include at least one portion having first spill costs and at least one portion having second spill costs, wherein said first spill costs are smaller than said second spill costs;

said portion of said symbolic registers having first spill costs is said first portion assigned by said local register allocator; and said portion of said symbolic registers having second spill costs is said second portion assigned by said global register allocator.

13. The method of claim 8 wherein:

said symbolic registers include at least one portion having a shallow region and at least one portion having a nested region;

said portion of said symbolic registers having said shallow region is said first portion assigned by said local register allocator; and said portion of said symbolic registers having said nested region is said second portion assigned by said global register allocator.

* * * * *